United States Patent Office 3,663,658
Patented May 16, 1972

3,663,658
POLYESTER COMPOSITIONS AND AIR-DRYING COMPOSITIONS THEREOF
Frank Scardiglia, Woodcliff Lake, N.J., and Israel J. Dissen and Takeo Hokama, Chicago, Ill., assignors to Velsicol Chemical Corporation, Chicago, Ill.
No Drawing. Continuation-in-part of application Ser. No. 826,699, May 21, 1969, which is a continuation-in-part of application Ser. No. 554,301, June 1, 1966. This application Apr. 30, 1970, Ser. No. 33,501
Int. Cl. C08f 21/00, 21/02
U.S. Cl. 260—869
13 Claims

ABSTRACT OF THE DISCLOSURE

This invention discloses new air drying polyester compositions comprising the adduct of maleic acid or anhydride and trans-piperylene; an unsaturated dicarboxylic compound selected from the group consisting of maleic acid, maleic anhydride and fumaric acid; and glycol.

---

This application is a continuation-in-part of our copending application Ser. No. 826,699, filed May 21, 1969, now abandoned; which in turn is a continuation-in-part of our application Ser. No. 554,301 filed June 1, 1966, which was copending therewith and is now abandoned.

This invention relates to new polyester compositions and polymerizable compositions thereof which dry rapidly in the presence of air at ambient temperatures. More particularly this invention relates to new linear polyester compositions having as their essential ingredients the adduct of maleic acid or anhydride and transpiperylene.

Ordinarily, polyester-styrene compositions in thin sections, such as coating, will not cure satisfactorily in the presence of air. Atmospheric oxygen has a retarding effect on the free radical polymerization mechanisms by which these compositions cure. After curing in the presence of air, the undersurface of the film may be tough and strong, but the surface is tacky and susceptible to attack by solvents.

One method for overcoming this problem is the mechanical exclusion of oxygen from the composition either by performing the application and cure in the presence of an inert atmosphere such as nitrogen or more practically by adding barrier substances such as paraffin wax to the formulation. The wax exudes to the surface of the coating or article as the cure progresses. After the cure the wax must be removed, for example, by sanding and polishing. The use of wax has many disadvantages. One disadvantage is the necessity of the sanding and polishing operations. In the case of a coating, the wax also migrates to the interface of the substrate and the coating, weakening the bond therebetween. The surface of the coating is often unattractive due to the exudation of the wax to the surface, and even after the sanding and polishing the surface may be defaced by delayed exudation of the wax.

More recently, attempts have been made to "build" into the system the capacity to cure even in the presence of atmospheric oxygen. One such system makes use of tetrahydrophthalic anhydride (4-cyclohexene-1,2 - dicarboxylic anhydride) as the essential ingredient in the polyester. Depending on the formulation, the coating from this polyester and styrene plus other ingredients such as free radical catalysts and driers allowed the coatings to dry in about 3 to 5 hours at room temperature.

While drying times of from 3 to 5 hours at room temperature were useful for some purposes, they still detracted from and prevented the practical and widespread use of these compositions in many areas. Thus, there is a presently existing need for a polyester and coating compositions thereof having short and more practical drying times, such as about two hours or less, or preferably one hour or less at room temperature, and in the order of about 15 minutes at moderately higher temperatures, such as 140° F.

Therefore, it is one object of the present invention to provide polymerizable compositions having rapid drying rates in the presence of atmospheric oxygen at ambient temperatures.

It is another object of this invention to provide polymerizable compositions which can be rapidly cured at ambient temperatures and at moderately increased temperatures while exposed to air or oxygen without exhibiting any under- or uncured, tacky, exposed surfaces.

These and other objects and advantages of the present invention will be apparent from the ensuing description.

It has now been discovered that compositions and particularly coating compositions having curing times of less than two hours and often about one hour and less than one hour in air at ambient temperatures, and in the order of 15 minutes or less at above about 140° F., can be prepared by the use of the new linear polyesters of the present invention. By ambient temperatures, normal room temperatures are intended. This short drying or cure time permits the use of the new compositions in numerous applications wherein exceedingly short drying times at ambient temperatures are necessary. In addition, the compositions of the present invention are light in color and have excellent flow and leveling properties. The coating compositions of the present invention have excellent hardness, often achieving essentially maximum hardness in approximately 2–3 hours; have excellent gloss; are resistant to marring and scratching; and are also resistant to many solvents and other chemicals.

Among the numerous applications in which the coating compositions containing the polyester of the present invention can be utilized are as coatings on a larger number of substrates such as wood, metal, paper, plastics, pressed wood products, concrete blocks and the like.

The novel and unexpected properties of the compositions described herein result from the use of the linear polyester of this invention which comprises the adduct of trans-piperylene, and maleic acid or its anhydride; an unsaturated dicarboxylic compound selected from the group consisting of maleic acid, maleic anhydride and fumaric acid; and a glycol.

The adduct of trans-piperylene and maleic anhydride, i.e. cis-3-methyl-4-cyclohexene-cis,cis-1,2-dicarboxylic anhydride M.P. 63–65° C. has been found to impart into polyesters properties, particularly rapid drying rate, not only not found in other materials used for this purpose but also not obtained by the use of the three stereo isomers of this compound. This critical material will hereinafter be identified as Beta-PMAA. The three stereo isomers of Beta-PMAA have been reported in "The Diels Older Reactions of the Piperylene Isomers With Maleic Anhydride and Fumaric Acid" by David Craig, vol. 72, J.A.C.S. pp. 1678–1681, April 1950, and are as follows:

Trans-3-methyl-4-cyclohexene-cis,cis-1,2-dicarboxylic anhydride M.P. 41° C. hereinafter referred to as Alpha-PMAA.
Cis-3-methyl-4-cyclohexene - cis,trans - 1,2 - dicarboxylic anhydride M.P. 133° C. hereinafter referred to as Gamma-PMAA.
Trans-3-methyl-4-cyclohexene - cis,trans-1,2-dicarboxylic anhydride, M.P. 120°–121° C. hereinafter referred to as Delta-PMAA.

These four stereo isomers have the following structural formulas:

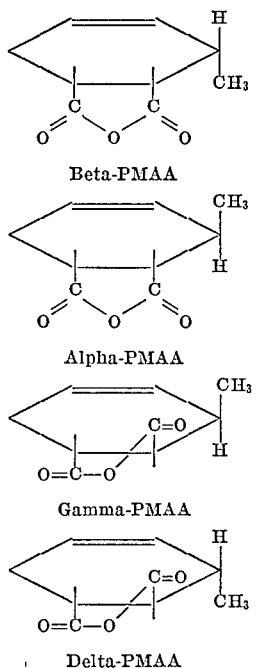

Beta-PMAA   I

Alpha-PMAA   II

Gamma-PMAA   III

Delta-PMAA   IV

The preparation of the adduct of trans-piperylene and maleic anhydride useful in the polyesters can be carried out by the following procedure. Maleic anhydride and a small amount of an inert aromatic hydrocarbon solvent (about 10 to 30% by weight based on the maleic anhydride), such as toluene or xylene, are charged into a suitable reaction vessel and are heated until the mixture becomes homogeneous. At least an equimolar amount of trans-piperylene is then slowly added to the reaction vessel with vigorous stirring and sufficient cooling to maintain the reaction temperature between about 40 and about 80° C. After the addition is completed further stirring and maintaining of the temperature for a period of up to about 3 hours can be desirable to insure the completion of the reaction. After this time the adduct of trans-piperylene and maleic anhydride can be recovered in excellent yields and high purity as a white solid having a melting point of 63 to 65° C. upon distillation of the reaction products under reduced pressure.

The beta isomer is thermodynamically less stable than certain of its stereoisomers. Consequently, care must be taken during distillation so as to prevent undesired isomerization or rearrangement of its unsaturation. In particular, during distillation the system must be kept free of acids, bases and transition metal salts.

It is surprising and unexpected that the adduct heretofore described provides the properties described above, particularly the rapid drying rate. Adducts of similar structure, such as tetrahydrophthalic anhydride (4-cyclohexene-1,2-dicarboxylic anhydride:

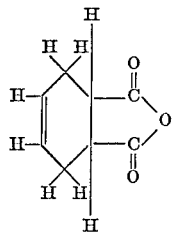

V when incorporated into a polymerizable mixture of a polyester and polymerizable monomer, provide a drying time of about 4½ hours or more at ambient temperatures; while the adduct of isoprene and maleic anhydride (4-methyl-4-cyclohexane-1,2-dicarboxylic anhydride:

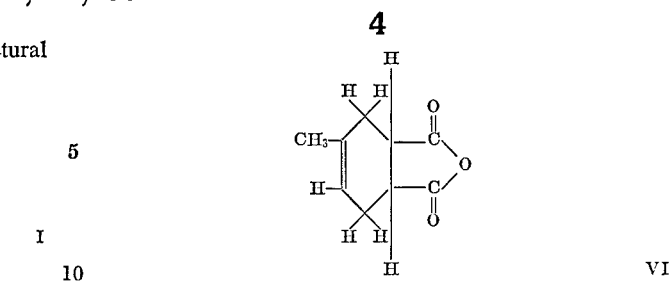

VI has been found in a similar mixture to give a drying time of at best 5 hours or more at ambient temperatures. Drying time as used above, is the period after application that a ball of cotton fibers pressed onto the film can be brushed off the film readily, hereinafter called the "press free time." Moreover, by chemically shifting the double bond in the cyclohexene ring of Beta-PMAA and its acid to any of the other positions, the drying time of polymerizable compositions prepared therefrom is substantially lengthened. Thus it is unexpected that the use of the adduct of this invention, the Diels-Alder adduct of trans-piperylene and maleic acid or its anhydride in the polyester provides properties not obtainable with closely related compounds.

The components which comprise the polyester of this invention must be present therein in certain molar ratios in order to impart the desirable and rapid drying times to curable polyester compositions. Thus, the linear polyester of the present invention comprises from about 10 to about 40 mole percent of the adducts hereinabove described, from about 10 to about 40 mole percent of an unsaturated dicarboxylic compound selected from the group consisting of maleic acid, maleic anhydride and fumaric acid, and from about 50 to about 70 mole percent glycol.

In a preferred embodiment of this invention the polyester comprises from about 10 to about 30 mole percent of the adduct, from about 20 to about 40 mole percent of the unsaturated dicarboxylic compound, and from about 50 to about 60 mole percent glycol. It is preferred to use an excess of glycol such as from about 5 to about 15% excess of the equimolar amount of dicarboxylic component.

When molar ratios other than those defined above are used the air drying properties of the resulting polyester degenerate rapidly.

The linear polyester of the present invention can also include one or more diacid, anhydride or other ester forming derivatives of dicarboxylic acids; these compounds being selected from the group consisting of aliphatic, cycloaliphatic and aromatic dicarboxylic acids and anhydrides. These compounds can be unsubstituted or substituted wherein the substituents are substantially inert to polymerization, such as halogen, nitro, cyano or ether, containing up to ten carbon atoms. Exemplary of suitable acids and anhydrides are chlorendic, phthalic, carbic, hydrogenated carbic, succinic, adipic and tetrachloro and tetrabromobenzene dicarboxylic acids. These compounds can comprise from about one to about 60 mole percent of the total dicarboxylic component used in making the essentially linear polyester; the amount of glycol being at least equimolar with the total moles of the adduct, unsaturated polycarboxylic compound and diacid or anhydride compounds.

Air-drying, fire retardant coatings and articles can be prepared by the use of these halogenated dicarboxylic compounds, as well as by the use of phosphorous compounds, in the polyesters of the present invention using techniques known to the art. Where fire retardant coatings or articles are desired the polymerizable mixture should contain at least 6% bromine, at least 12.5% chorine or at least 3.5% phosphorous, preferably contributed to the mixture by one or more of the above halogen containing compounds, particularly a compound selected from the group consisting of chlorendic anhydride, chlorendic acid, tetrachlorophthalic anhydride, tetrachlorophthalic acid, tetrachloroterephthalic acid, tetrabromophthalic anhydride, tetrabromophthalic acid and tetrabromoterephthalic acid.

Glycol is required in the linear polyester of the present invention, and one glycol or a mixture of several glycols can be used. Examples of suitable glycols are ethylene glycol, di-, tri-, tetra-, and higher -ethylene glycols, 1,2-propylene glycol, trimethylene glycol, polypropylene glycol, dipropylene glycol, 2,2-dimethyl-1,3-propane-diol, etc. Diethylene glycol is the preferred glycol for use in the polyester.

In addition to maleic anhydride, maleic acid and fumaric acid, the unsaturated dicarboxylic compounds in the polyester may be selected from or partially replaced by other ester forming derivatives of dicarboxylic acids, such as diacid chlorides, dialkyl and diaryl esters, and the like.

The linear polyester of the present invention can be prepared readily using one of the standard procedures known to the art such as the fusion cook or solvent methods. For example the ingredients can be combined with a quantity of an inert solvent such as xylene and heated to reflux in a nitrogen atmosphere. The water formed in the reaction is azeotroped with the inert solvent and removed by means known to the art. The inert solvent remaining in the reaction mixture at or near the end of the reaction can be removed by heating, by sparging with an inert gas or by the application of vacuum. The reaction is preferably continued until a low acid number, such as about 40 or less, and more preferably about 35 or less, is obtained. Although the resulting polyester can be isolated as such, it is preferred to prepare the composition in the form in which the polyester is to be used, and transport or store the compositions in that form.

A useful composition of the polyester of the present invention is a liquid, hardenable polymerizable mixture comprising the said polyester and at least one monomeric ethylene derivative copolymerizable by free radical addition polymerization with the unsaturation in the polyester. Monomeric ethylene derivatives copolymerizable with unsaturation in polyesters via free radical addition polymerization and their use are known to the art and are exemplified by those of the styrene, vinyl ester and acrylate type. The styrene type ethylene derivatives can be described by the following structural formula:

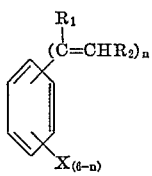

wherein $R_1$ and $R_2$ are independently selected from the group consisting of hydrogen and alkyl; $n$ is an integer greater than zero and less than six, preferably from one to two; and each X is independently selected from the group consisting of hydrogen, alkyl and halogen. The acrylic monomers can be described by the following structural formula

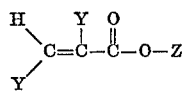

wherein Y and Z are independently selected from the group consisting of hydrogen and alkyl. The alkyl groups in the above formulas preferably contain from one to ten carbon atoms.

The preferred ethylene derivatives for copolymerization with the polyester are styrene, vinyl toluenes, chlorostyrenes, vinyl acetate, vinyl benzoate, methyl acrylate, ethyl acrylate, methyl methacrylate and a mixture of styrene and methyl methacrylate.

Other ethylene derivatives can be used in place of or with those described above. Exemplary of these are: diacetone acrylamide, alpha unsaturated vinyl ketones such as vinyl methyl ketone, alpha unsaturated vinyl sulfones and divinyl sulfone; vinyl esters of saturated and unsaturated mono- and polycarboxylic acids such as vinyl propionate and succinic acid divinyl esters; N-vinyl lactams such as N-vinyl pyrrolidone and N-vinyl caprolactam; and vinyl ethers of mono- and polyhydro compounds such as isobutyl vinyl ether and butane diol-1,4-divinyl ether.

The polymerizable mixture comprises from about 40 to about 80% by weight of the polyester and from about 20 to about 60% by weight of the ethylene derivatives or ethylene derivative-acrylate mixture.

The polymerizable mixtures may be stabilized by adding the usual polymerization inhibitors to prevent gelation and increase the storage or shelf life of the mixture. Suitable inhibitors are for example mono- and polyhydric phenols such as hydroquinone, benzoquinone, resorcinol, pyrocatechol and the like. Only a small amount of inhibitor is required such as from about 0.005 to about 0.1% based on the weight of the mixture. It is preferable to add from about 0.01 to about 0.03% inhibitor.

The polymerizable mixtures described above can be stored for long period of time without appreciable polymerization. In order to utilize the mixtures, polymerization is initiated by the addition of catalyst, particularly the peroxide and hydroperoxide catalysts. Examples of especially suitable peroxide and hydroperoxide catalysts are methyl ethyl ketone peroxides, cyclohexanone peroxide, cumene hydroperoxide, tertiary-butyl hydroperoxide, benzoyl peroxide, lauroyl peroxide, tertiary-butyl perbenzoate, tertiary-butyl permaleate, and ditertiary-butyl peroxide. Other catalysts which can be used to initiate or accelerate the polymerization reaction are the azo compounds such as azo-bis-isobutyronitrile and azo-bis-isobutyric acid dibutyl ester and redox systems consisting of a peroxide and a tertiary amine. A small amount of catalyst such as for example between 0.2% and 3% based on the weight of the polymerizable mixture has been found to be sufficient. It is preferable to add the catalyst immediately before application of the mixture. Where the mixture is to be sprayed as a coating, it is preferable to add the catalyst to the mixture in the mixing chamber of the spray gun.

In conjunction with the catalysts, an accelerator or promoter, such as the metal driers commonly used in polyester solutions can be incorporated into the polyester solution to enhance curing, i.e. crosslinking, at ambient temperatures. The naphthenates of the metals iron, cobalt, nickel, manganese, chromium, lead, vanadium, zinc, zirconium, cerium, aluminum and calcium are especially suitable. In addition the resinates, octoates or linoleates or metal compounds soluble in the polymerizable mixture may be used. Often it is desirable to add mixtures of the various driers to obtain particular properties. These driers are normally used in amounts between about 0.01 and 1.0% of the metal based on the weight of the polymerizable mixture.

The polymerizable mixtures described above are particularly useful in coating substrates, such as those heretofore described, in the presence of oxygen, particularly in the presence of air, with a coating having a hard, dry surface within less than 3 hours. Coating as described above can be accomplished by applying to the substrate the liquid, hardenable polymerizable mixture and a free radical catalyst therefor at room temperature and maintaining the coated substrate at room temperature for less than three hours until the surface of the coating is dry. Coatings having a hard, dry surface within less than two hours can be obtained as described above using the preferred polyester of diethylene glycol, cis-3-methyl-4-cyclohexene-cis,cis-1,2-dicarboxylic anhydride and fumaric acid, and styrene with the catalyst. The polymerizable mixture also can be used to coat a substrate in the presence of oxygen with a coating having a hard, dry surface within about 15 minutes by applying the mixture and free radical catalyst therefor as above, and then heating the coated substrate to a temperature above about 50° C., and preferably below about 150° C. for a maximum time of about 15 minutes until the surface of the coating is dry.

The preparation and properties of the linear polyester and the polymerizable mixtures of the present invention are illustrated in the following examples. The examples represent typical formulations and conditions and it will be readily apparent to those skilled in the art that other formulations and conditions can readily be used. Two procedures were used in preparing the polyesters, as follows:

PROCEDURE 1

Cis-3-methyl-4-cyclohexene-cis,cis-1,2-dicarboxylic anhydride (83.0 g.; 0.5 mol), fumaric acid (174.2 g.; 1.5 mols) diethylene glycol (222.8 g.; 2.1 mols) and xylene (50 ml.) were placed in a one-liter flask equipped with a mechanical stirrer, internal thermometer, gas inlet tube and reflux condenser provided with a Dean-Stark trap. Nitrogen gas was passed through the vapor space of the flask to exclude air and a blanket of the gas was maintained over the reaction mixture during the reaction. The contents of the flask were stirred and heated at reflux (195–200° C.). The water produced by the reaction was removed from the azeotrope and collected in the Dean Stark trap. The mixture was heated at reflux until the acid number of the polyester was below 40. A gas dispersion tube was then inserted below the surface of the mixture and a steady stream of nitrogen gas was bubbled through the mixture until the xylene was removed. The remaining mixture was heated until the acid number was 34.4. The polyester thus produced can be isolated as such.

PROCEDURE 2

Beta-PMAA, diethylene glycol and toluene (40 ml.) were placed in a one liter flask equipped with a mechanical stirrer, internal thermometer, a dropping funnel, a Snyder column fitted with a Dean-Stark trap and reflux condenser. Toluene (60 ml.) was charged to the dropping funnel. A nitrogen atomsphere was maintained over the reaction mixture through an adapter attached to the reflux condenser. The contents of the flask were stirred and heated at 210° C. for five hours until the acid number of the reaction mixture was less than 40. The reaction temperature was maintained by a refluxing toluene-water azeotropic mixture. Water produced by the esterification reaction was collected and removed from the Dean-Stark trap. The reaction mixture was cooled to 80° C. and fumaric acid was added to the reaction flask. The reaction mixture was reheated to 195° C. and maintained at 190–195° C. for 3 hours or until the acid number of the polyester was below 40. The reaction mixture was devolatilized under reduced pressure (190–195° C./30–60 min. 1.0 mm. Hg) to remove toluene and excess diethylene glycol.

However, it was preferred to obtain the polyester in a polymerizable mixture with an unsaturated monomer capable of reacting with fumaroyl or maleoyl unsaturation. Therefore, the heated polyester was cooled to below 160° C. and mixed with hyroquinone (0.1 g.). The polyester and inhibitor were stirred until the temperature fell below 130° C., and sufficient styrene was then added to provide a solution containing 70% solids.

The polymerizable mixture produced above was used as a coating as follows: A portion of the polymerizable mixture (20 g.) was placed into an aluminum dish. A 60% solution of methyl ethyl ketone peroxide in dimethylphthalate (0.3 g.) and cobalt naphthenate containing 6% cobalt (0.14 g.) were stirred into the polymerizable mixture. The mixture was drawn onto a glass plate with a 3 mil Bird applicator.

The lint free time and press free time of the film were determined. The lint free time is the period after the application of the film at which cotton fibers dropped on the film can be blown off in accordance with the cotton fiber method, ASTM D–1640. Press free time has been previously defined. The press free time upon curing at 60° C. was also determined. Pencil hardness is determined by writing with pencils of various hardness over the film after the designated period of time and determining the pencil of greatest hardness which does not penetrate the film, the pencils being pointed with a flat end by a draftsman's mechanical sharpener.

For the purpose of comparison, polyesters and polymerizable mixtures and films therefrom were prepared using in the aforedescribed procedures the adducts of Formulas V and VI as well as the three stereoisomers of Beta-PMAA in place of the Beta-PMAA.

To further demonstrate the unexpected properties of the polyester of the present invention in affording unusually short drying times, a polyester was prepared from a mixture of adducts wherein the double bond of Beta-PMAA was shifted. A quantity of Beta-PMAA was subjected to an acid catalyzed rearrangement of its double bond using known procedures. The resulting material appeared to be a mixture of at least three components in addition to the starting material. This mixture was assigned the following composition based on gas chromatographic and nuclear magnetic resonance analyses: about 30% 3-methyl-1-cyclohexene-1,2-dicarboxylic anhydride, about 30% 3-methyl-2-cyclohexene-1,2-dicarboxylic anhydride, about 30% 3-methyl-3-cyclohexene-1,2-dicarboxylic anhydride, and about 10% Beta-PMAA. A polyester, and a polymerizable mixture and film therefrom, were prepared from the mixture (Example 34) and from pure 3-methyl-cyclohexene-1,2-dicarboxylic anhydride (Example 33).

For the sake of brevity the following terms will hereinafter be identified as indicated: diethylene glycol will be identified as DEG, monoallyl ether of trimethylol propane will be identified TMPME and the adducts of Formulas V and VI, as V and VI, respectively.

Table I details the components and their proportions as used in each example, while Table II gives properties of films of 3-mil thickness prepared from 60% or 70% solutions of the polyesters described in Table I, as follows:

TABLE I

| | Grams | Moles | Final acid value | Percent solids in solution | Method of preparation |
|---|---|---|---|---|---|
| Example 1: | | | | | |
| Beta-PMAA | 83.0 | 0.5 | 34.4 | 70 | 1 |
| Fumaric acid | 174.2 | 1.5 | | | |
| DEG | 222.8 | 2.1 | | | |
| Example 2: | | | | | |
| Beta-PMAA | 83.0 | 0.5 | 34.4 | 50 | 1 |
| Fumaric acid | 174.2 | 1.5 | | | |
| DEG | 222.8 | 2.1 | | | |
| Example 3: | | | | | |
| Beta-PMAA | 49.8 | 0.3 | 22.4 | 60 | 2 |
| Fumaric acid | 81.3 | 0.7 | | | |
| DEG | 111.4 | 1.05 | | | |
| Example 4: | | | | | |
| Beta-PMAA | 20.8 | 0.125 | <50 | 70 | 1 |
| Fumaric acid | 101.6 | 0.875 | | | |
| DEG | 111.4 | 1.05 | | | |
| Example 5: | | | | | |
| Beta-PMAA | 20.8 | 0.125 | <50 | 50 | 1 |
| Fumaric acid | 101.6 | 0.875 | | | |
| DEG | 111.4 | 1.05 | | | |
| Example 6: | | | | | |
| Beta-PMAA | 166 | 1.0 | 16.5 | 60 | 2 |
| Fumaric acid | 1042.0 | 9.0 | | | |
| DEG | 1114.0 | 10.5 | | | |
| Example 7: | | | | | |
| Beta-PMAA | 249.0 | 1.5 | 18.0 | 60 | 1 |
| Fumaric acid | 987.0 | 8.5 | | | |
| DEG | 1114.0 | 10.5 | | | |
| Example 8: | | | | | |
| Beta-PMAA | 32.4 | 0.195 | 20.3 | 60 | 1 |
| Fumaric acid | 91.0 | 0.783 | | | |
| DEG | 112.0 | 1.056 | | | |
| Example 9: | | | | | |
| Beta-PMAA | 498.0 | 3.0 | 23.9 | 60 | 1 |
| Fumaric acid | 348.5 | 3.0 | | | |
| DEG | 668.0 | 6.3 | | | |
| Example 10: | | | | | |
| Beta-PMAA | 998.0 | 6.0 | 12.0 | 60 | 2 |
| Fumaric acid | 465.0 | 4.0 | | | |
| DEG | 1114.0 | 10.5 | | | |

TABLE I—Continued

| | Grams | Moles | Final acid value | Percent solids in solution | Method of preparation |
|---|---|---|---|---|---|
| Example 11: | | | | | |
| Beta-PMAA | 149.4 | 0.9 | <58 | 70 | 1 |
| Fumaric acid | 34.8 | 0.3 | | | |
| DEG | 133.7 | 1.25 | | | |
| Example 12: | | | | | |
| Alpha-PMAA | 16.6 | 0.10 | 20.5 | 60 | 2 |
| Beta-PMAA | 33.2 | 0.20 | | | |
| Fumaric acid | 81.3 | 0.70 | | | |
| DEG | 111.4 | 1.05 | | | |
| Example 13: | | | | | |
| Alpha-PMAA | 2.5 | 0.015 | 22.4 | 60 | 2 |
| Beta-PMAA | 46.6 | 0.28 | | | |
| Gamma-PMAA | 0.7 | 0.005 | | | |
| Delta-PMAA | | | | | |
| Fumaric acid | 81.3 | 0.70 | | | |
| DEG | 111.4 | 1.05 | | | |
| Example 14: | | | | | |
| Beta-PMAA | 832.0 | 5.0 | 34.2 | 65 | 1 |
| Maleic anhydride | 490.0 | 5.0 | | | |
| DEG | 1114.0 | 10.5 | | | |
| Example 15: | | | | | |
| Beta-PMAA | 99.6 | 0.6 | 33.5 | 60 | 1 |
| Maleic anhydride | 137.0 | 1.4 | | | |
| DEG | 222.8 | 2.1 | | | |
| Example 16: | | | | | |
| Beta-PMAA | 41.5 | 0.25 | <49 | 70 | 1 |
| Fumaric acid | 87.1 | 0.75 | | | |
| DEG | 58.3 | 0.50 | | | |
| TMPME | 87.0 | 0.50 | | | |
| Example 17: | | | | | |
| Beta-PMAA | 41.5 | 0.25 | <54 | 50 | 1 |
| Fumaric acid | 87.0 | 0.75 | | | |
| TMPME | 182.7 | 1.05 | | | |
| Example 18: | | | | | |
| Beta-PMAA | 41.5 | 0.25 | 35.0 | 70 | 1 |
| Chlorendic acid | 92.8 | 0.25 | | | |
| Fumaric acid | 58.0 | 0.50 | | | |
| DEG | 111.4 | 1.05 | | | |
| Example 19: | | | | | |
| Beta-PMAA | 41.5 | 0.25 | <44 | 70 | 1 |
| Phthalic anhydride | 37.0 | 0.25 | | | |
| Fumaric acid | 58.0 | 0.50 | | | |
| DEG | 111.4 | 1.05 | | | |
| Example 20: | | | | | |
| Beta-PMAA | 83.1 | 0.5 | 22.9 | 60 | 2 |
| Isophthalic acid | 83.0 | 0.5 | | | |
| Fumaric acid | 116.1 | 1.0 | | | |
| DEG | 222.8 | 2.10 | | | |
| Example 21: | | | | | |
| Beta-PMAA | 41.5 | 0.25 | <41.0 | 70 | 1 |
| Adipic acid | 36.5 | 0.25 | | | |
| Fumaric acid | 58.0 | 0.50 | | | |
| DEG | 111.4 | 1.05 | | | |
| Example 22: | | | | | |
| Beta-PMAA | 166.2 | 1.0 | 23.8 | 60 | 2 |
| Fumaric acid | 116.1 | 1.0 | | | |
| Propylene glycol | 182.5 | 2.4 | | | |
| Example 23: | | | | | |
| Beta-PMAA | 124.5 | 0.75 | 21.3 | 60 | 2 |
| Fumaric acid | 87.2 | 0.75 | | | |
| Neopentyl glycol | 164.0 | 1.575 | | | |
| Example 24: | | | | | |
| Beta-PMAA | 41.5 | 0.25 | <43.0 | 70 | 1 |
| Fumaric acid | 87.1 | 0.75 | | | |
| 1,3-butylene glycol | 45.0 | 0.50 | | | |
| DEG | 58.3 | 0.50 | | | |
| Example 25: | | | | | |
| Beta-PMAA | 49.8 | 0.3 | 18.3 | 60 | 2 |
| Fumaric acid | 81.3 | 0.7 | | | |
| DEG | 111.4 | 1.05 | | | |
| Example 26: | | | | | |
| Alpha-PMAA | 56 | 0.34 | 21.3 | 60 | 2 |
| Fumaric acid | 91.6 | 0.79 | | | |
| DEG | 127.0 | 1.20 | | | |
| Example 27: | | | | | |
| Alpha-PMAA | 84.3 | 0.5 | 28.7 | 60 | 2 |
| Beta-PMAA | 13.9 | 0.08 | | | |
| Fumaric acid | 162.5 | 1.40 | | | |
| DEG | 222.8 | 2.10 | | | |
| Example 28: | | | | | |
| Alpha-PMAA | 24.9 | 0.15 | ------ | 60 | 2 |
| Beta-PMAA | 24.9 | 0.15 | | | |
| Fumaric acid | 81.3 | 0.70 | | | |
| DEG | 111.4 | 1.05 | | | |
| Example 29: | | | | | |
| Gamma-PMAA | 4.2 | 0.02 | 26.9 | 60 | 2 |
| Delta PMAA | 37.4 | 0.23 | | | |
| Fumaric acid | 67.8 | 0.58 | | | |
| DEG | 94.4 | 0.89 | | | |
| Example 30: | | | | | |
| Gamma-PMAA | 4.5 | 0.03 | 30.8 | 60 | 2 |
| Delta-PMAA | 40.4 | 0.24 | | | |
| Fumaric acid | 73.1 | 0.63 | | | |
| DEG | 111.4 | 1.05 | | | |
| Example 31: | | | | | |
| Gamma-PMAA | 26.6 | 0.16 | 32.7 | 60 | 2 |
| Delta-PMAA | 26.6 | 0.16 | | | |
| Fumaric acid | 37.1 | 0.32 | | | |
| Example 32: | | | | | |
| Gamma-PMAA | 16.1 | 0.09 | ------ | 60 | 2 |
| Delta-PMAA | 1.8 | 0.01 | | | |
| Fumaric acid | 29.2 | 0.25 | | | |
| DEG | 40.1 | 0.38 | | | |
| Example 33: | | | | | |
| 3-methyl-3-cyclohexene-1,2-dicarboxylic anhydride | 142.8 | 0.86 | 32.7 | 60 | 2 |
| Fumaric acid | 142.8 | 0.86 | | | |
| DEG | 185.5 | 1.75 | | | |
| Example 34: | | | | | |
| Mixture obtained by rearranging beta-PMAA | 42.5 | 0.26 | <40 | 70 | 1 |
| Fumaric acid | 87.1 | 0.75 | | | |
| DEG | 111.4 | 1.05 | | | |
| Example 35: | | | | | |
| Adduct of Formula V | 83.1 | 0.5 | <47 | 70 | 1 |
| Fumaric acid | 174.2 | 1.5 | | | |
| DEG | 222.8 | 2.1 | | | |
| Example 36: | | | | | |
| Adduct of Formula VI | 83.1 | 0.5 | <38 | 70 | 1 |
| Fumaric acid | 174.2 | 1.5 | | | |
| DEG | 222.8 | 2.1 | | | |

Example 2.—Polyester of Example 1 was dissolved in designated concentrate of styrene.
Example 5.—Polyester of Example 4 was dissolved in mixture of 50% styrene and 50% methyl methacrylate.
Example 14.—Polyester was dissolved in vinyl benzoate.
Example 25.—Polyester was dissolved in o-chlorostyrene.

TABLE II.—ROOM TEMPERATURE CURE

| Example | Lint free time (min.) | Press free time (min.) | Pencil hardness | | |
|---|---|---|---|---|---|
| | | | 6 hrs. | 24 hrs. | 5 days |
| 1 | 25 | 50 | 4H | 4H | 4H |
| 2[1] | 10 | 35 | | | |
| 3 | 33 | 53 | 4H[2] | 6H | 7H[3] |
| 4 | | 90 | 4H | 4H | |
| 5 | | 90 | 3H | 4H | |
| 6 | 90 | 108 | 5H[2] | 9H | 9H[3] |
| 7 | 47 | 58 | 7H[2] | 9H | |
| 8 | 40 | 57 | 3H[2] | 6H | |
| 9 | 33 | 47 | 3H[2] | 6H | 5H[3] |
| 10 | 41 | 53 | 4H[2] | 5H | 6H[3] |
| 11 | | 105 | 3H | 4H | |
| 12 | 42 | 63 | 3H[2] | 5H | 7H[3] |
| 13 | 33 | 53 | 4H[2] | 6H | 7H[3] |
| 14 | | 63 | | 8H | 7H[3] |
| 15 | 55 | 65 | 5H[2] | 7H | |
| 16 | 17 | 40 | | 4H | 4H |
| 17 | 14 | 53 | | 4H | 4H |
| 18 | 35 | 50 | 3H | 3H[d] | |
| 19 | 30 | 90 | | 4H | 4H |
| 20 | 65 | 80 | 8H[2] | 8H | 9H[3] |
| 21 | 90 | 150 | | | |
| 22 | 25 | 40 | 3H[2] | 6H | 6H[3] |
| 23 | 25 | 35 | 3H[2] | 5H | 8H[3] |
| 24 | 55 | 120 | | 4H | 4H |
| 25 | | 59 | | 5H | 5H |
| 26 | 280 | 310 | | 5H | 7H[3] |
| 27 | 133 | 146 | 8H[2] | 8H | 9H[3] |
| 28 | | 255 | 2H[2] | 6H | 6H[3] |
| 29 | 319 | 344 | 1H[2] | 6H | 6H[3] |
| 30 | | 255 | 2H[2] | 6H | 6H[3] |
| 31 | 215 | 235 | 4H[2] | 6H | 5H[3] |
| 32 | (5) | | | | |
| 33 | 245 | 252 | 8H[2] | 9H | 9H[3] |
| 34 | >300 | (5) | | | |
| 35 | | 300 | 3H | 4H | 4H |
| 36 | 120 | 300 | 3H | 3H | 3H |

[1] Example 2 contained zirconium metal dries.
[2] Pencil hardness after 1 hour.
[3] Pencil hardness after 7 days.
[4] Pencil hardness after 17 hours.
[5] No cure.

In addition, the press free time upon curing of the polyesters at 60° C. was determined for certain of the compositions of the present invention as follows:

TABLE III

| Examples: | 60° C. cure press free time (min.) |
|---|---|
| 1 | 11 |
| 16 | 4½ |
| 21 | 35 |
| 24 | 17 |

The foregoing Examples 1–25 demonstrate the properties of the polyester of the present invention. It can be seen therefrom that the instant polyesters impart into polyesters drying times not obtained in polyesters prepared from structurally similar components.

Often a desirable balance of mechanical, physical and chemical properties, making the compositions of the present invention particularly useful in certain applications, can be obtained by substituting at least part of the ingredients of the polyesters of this invention with ingredients that have essentially the same function. It is to be understood that in order to achieve a satisfactory drying rate in these modified polyesters the adduct of maleic acid or anhydride and trans-piperylene is present in the proportion previously described.

Polyesters and polymerizable mixtures and films prepared therefrom of varied properties can also be obtained by varying the temperature at which the polyester is prepared, and by performing the reaction to obtain a polyester of higher or lower acid number.

We claim:
1. A linear polyester of a mixture comprising (A) from about 10 to about 40 mole percent of cis-3-methyl-4-cyclohexene-cis,cis-1,2-dicarboxylic anhydride having a melting point of about 63 to 65° C. or its acid; (B) from about 10 to about 40 mole percent of a compound selected from the group consisting of maleic acid, maleic anhydride and fumaric acid; and (C) from about 50 to about 70 mole percent glycol.
2. The polyester of claim 1 wherein the adduct (A) is cis-3-methyl-4-cyclohexene-cis,cis - 1,2 - dicarboxylic anhydride having a melting point of about 63 to 65° C.
3. The polyester of claim 1 wherein the dicarboxylic compound (B) is fumaric acid.
4. The polyester of claim 1 wherein the glycol (C) is diethylene glycol.
5. The polyester of claim 2 wherein the compound (B) is fumaric acid, and compound (C) is diethylene glycol.
6. The linear polyester of claim 2 wherein the adduct (A) comprises from about 10 to about 30 mole percent and the compound (B) comprises from about 20 to about 40 mole percent of the polyester.
7. A liquid, hardenable, polymerizable mixture comprising the polyester of claim 1 and at least one compound selected from the group consisting of

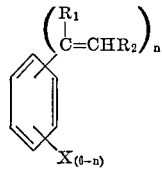

wherein $R_1$ and $R_2$ are independently selected from the group consisting of hydrogen and alkyl of from one to ten carbon atoms; $n$ is an integer greater than zero and less than six and each X is independently selected from the group consisting of hydrogen, alkyl of from one to ten carbon atoms and halogen,

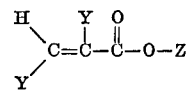

wherein Y and Z are independently selected from the group consisting of hydrogen and alkyl of from one to ten carbon atoms, vinyl acetate, and vinyl benzoate.
8. The composition of claim 7 wherein the ethylene derivative is selected from the group consisting of styrene, vinyl toluene, chlorostyrene, vinyl acetate, vinyl benzoate, methylacrylate, ethyl acrylate, methyl methacrylate and mixtures thereof.
9. The composition of claim 7 wherein the ethylene derivative is styrene.
10. The composition of claim 7 wherein the ethylene derivative is methyl methacrylate.
11. The composition of claim 7 wherein the ethylene derivative is vinyl benzoate.
12. The composition of claim 7 wherein the ethylene derivative is chlorostyrene.
13. The composition of claim 7 wherein the polyester comprises from about 40 to about 80 percent by weight and the ethylene derivative comprises from about 20 to about 60 percent by weight.

References Cited
UNITED STATES PATENTS

| | | | |
|---|---|---|---|
| 2,251,398 | 8/1941 | Soday | 260—75 |
| 2,475,731 | 7/1949 | Weith | 260—871 |
| 2,479,486 | 8/1949 | Gerhart | 260—861 |
| 3,004,003 | 10/1961 | Batzer | 260—873 |

FOREIGN PATENTS

| | | | |
|---|---|---|---|
| 810,222 | 3/1959 | Great Britain | 260—861 |
| 842,958 | 8/1960 | Great Britain | 260—175 |
| 964,172 | 7/1964 | Great Britain | 260—75 A |

OTHER REFERENCES

Arkdzjovskii et al.: Sb. Tr., Vses. Nauch-Issled. Inst. Novykh Stroit. Mater. 7, 110–20 (1966).

Bailey et al.: J. Am. Chem. Soc. 78, 670–72 (1956).

MELVIN GOLDSTEIN, Primary Examiner

U.S. Cl. X.R.

117—123 D, 132 B, 138.8 A, 148, 155 VA; 260—75 A, 861, 872